United States Patent [19]

Naganawa et al.

[11] Patent Number: 4,734,815
[45] Date of Patent: Mar. 29, 1988

[54] DISC CARTRIDGE WITH A CLEANING MECHANISM

[75] Inventors: Nobuhiko Naganawa, Ibaragi; Yoshitake Kato, Ibaragi; Minoru Fujita, Ibaragi; Kazuya Fukunaga, Toride, all of Japan

[73] Assignee: Hitachi Maxell, Ltd., Osaka, Japan

[21] Appl. No.: 888,424

[22] Filed: Jul. 23, 1986

[30] Foreign Application Priority Data

Jul. 23, 1985 [JP] Japan ............................. 60-161107
Nov. 22, 1985 [JP] Japan ............................. 60-261405

[51] Int. Cl.⁴ .......................................... G11B 23/02
[52] U.S. Cl. ................................... 360/133; 360/128
[58] Field of Search ............... 360/133, 135, 128, 97, 360/99

[56] References Cited

U.S. PATENT DOCUMENTS 4,482,929 11/1984 Beck et al. ................ 360/128 X

Primary Examiner—John H. Wolff
Attorney, Agent, or Firm—Birch, Stewart, Kolasch & Birch

[57] ABSTRACT

A disc cartridge which comprises an outer case formed of a top half and a bottom half assembled to the top half to provide a disc chamber for accommodating a recording disc adapted to be rotated, a pair of pressure plates mounted in the top half and bottom half so as to oppose each other, cleaning sheets laid between a disc and the pressure plates and openings defined respectively in the top half and bottom half so as to correspond to each of the pressure plates for pressing the pressure plates toward the disc.

7 Claims, 37 Drawing Figures

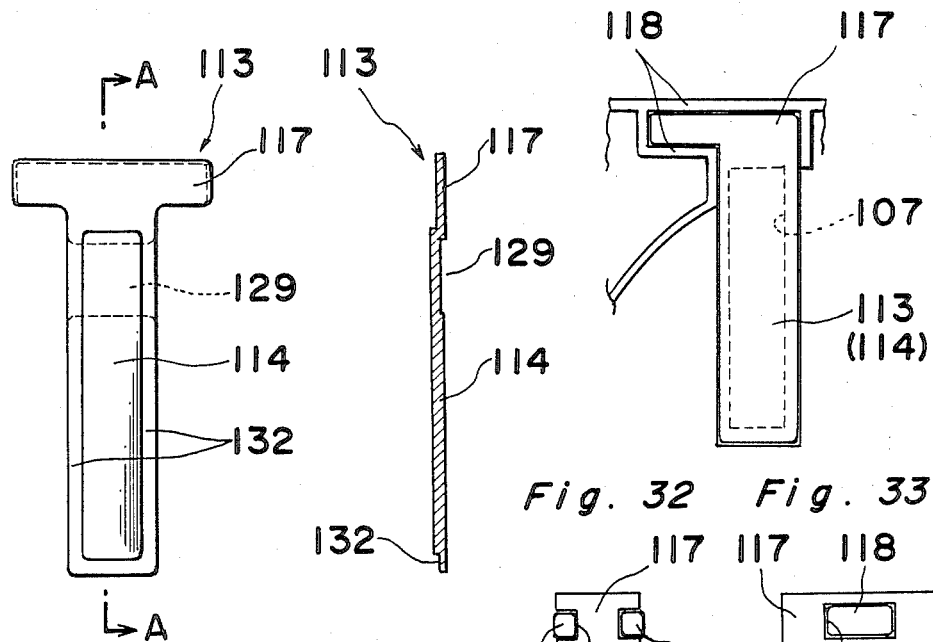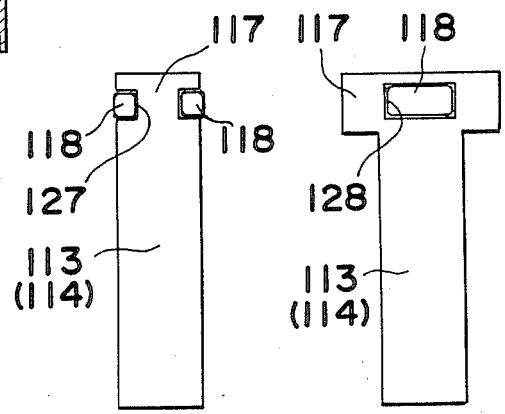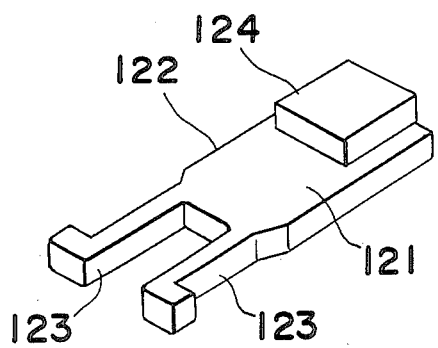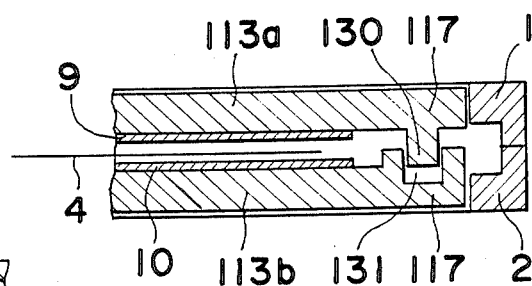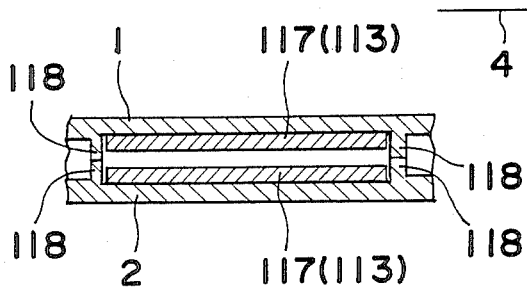

DISC CARTRIDGE WITH A CLEANING MECHANISM

BACKGROUND OF THE INVENTION

1. Field of the Invention

The present invention relates to a disc cartridge, and more specifically to a cleaning mechanism in a disc cartridge case for cleaning a recording disc.

2. Discussion of the Related Art

In a disc cartridge containing a recording disc, such as a so called floppy disc rotatably mounted in a cartridge case, there have been proposed various kinds of cleaning mechanisms for cleaning the floppy disc. FIG. 1 shows a typical conventional disc cartridge of the above kind, wherein an outer case 3 is formed by combining a top half 1 and a bottom half 2 each made of a hard plastic resin material. Head insertion windows 1a and 2a are defined in the top half 1 and bottom half 2 respectively and a drive hole 2b is defined at the center portion of the bottom half 2. A floppy disc 4 is accommodated in the space between the top and bottom halves 1 and 2 with a hub 5 of the floppy disc 4 exposed outside of the outer case 3 through the drive hole 2b so that the hub 5 and the floppy disc 4 can be rotated by a disc drive device (not shown).

In the disc cartridge mentioned above, a cleaning mechanism is usually provided in such a manner as described hereinafter.

A plurality of short parallel ribs 7 are formed on an inner surface of the top half 1 so as to face with a resilient plate 8a of a resilient member 8 hinged on the inner face of the bottom half 2 in a canti-lever manner. An upper cleaning sheet 9 and lower cleaning sheet 10 made of non woven sheet having a cleaning effect, with a generally C shape, are respectively provided on the inner surfaces of the top half 1 and bottom half 2 with the entire area or partial area bonded to the respective halves by an adhesive agent or thermal bonding agent. The disc is disposed between the upper sheet 9 and lower sheet 10 in a sandwich manner, as shown in FIG. 2, so as to press the cleaning sheets 9, 10 and the disc 4 by the resilient plate 8a toward the ribs 7. By this arrangement, both of the recording surfaces of the disc 4 can be cleaned by the cleaning sheet when the disc is rotated.

However, in the conventional cleaning mechanism mentioned above, the disc 4 is always subjected to pressure therefore, during a long time storage of the disc cartridge, the disc 4 may be deformed more or less partially at the position where the resilient plate 8a presses against the disc. In addition, foreign matter which was once caught by the cleaning sheets may be undesirably transferred to the disc 4, whereby there occurs an output fluctuation. In order to avoid the problems mentioned above, the pressure of the resilient member 8 against the cleaning sheets must be decreased, thereby resulting in a reduction in the cleaning effect. In addition, in case the top half 1 is bent, the level at which the disc 4 contacts the ribs i.e., the level of the rotational surface of the disc 4, may be displaced and error occurs in the rotational level of the disc 4.

Another conventional cleaning mechanism is shown in FIGS. 3 to 8, wherein the upper sheet 9 and lower sheet 10 are associated respectively with both halves 1 and 2, similar to the cleaning sheets shown in FIG. 1. There is provided a projection 11 on the inner surface of the top half 1 opposite the position of the head insertion window 1a of the top half 1. A through hole 12 of a square shape is defined in one corner of the bottom half 2 corresponding to the projection 11 so that a cleaning piece 13 of a generally square shape can be inserted into and removed from the disc cartridge through the through hole 12. As shown in FIGS. 4 to 6, a continuous rib 14 surrounding the hole 12 is formed on the inner face of the bottom half 2 with a receiving flange 15 formed at the inner peripheries of the rib 14 so as to receive stepped peripheral edges 13a of the cleaning piece 13 of a generally T shape in cross section on the flange 15, thereby preventing the cleaning piece 13 from being removed from the outer case 3. The disc 4 is kept between the upper and lower sheets 9 and 10 in a similar manner as mentioned in the first example.

In the second example, when the cartridge is not in use, as shown in FIG. 7, the disc 4 kept between the projection 11 and cleaning piece 13 can slightly contact either with the upper sheet 9 and lower sheet 10 at a minimal pressure. However, when the cartridge is used, as shown in FIG. 8, upon mounting of the cartridge on the disc drive device 20, a pressing member 16 provided by the disc drive device 20, pushes the cleaning piece 13 upward. The disc 4 is pressed toward the projection 11 via the upper and lower sheets 9 and 10, whereby the disc 4 can be cleaned.

The cleaning mechanism shown in the second example has a good cleaning effect and the foreign matter once caught by the upper and lower sheets 9 and 10 can not be transferred again to the disc 4. However, the drawback whereby the rotation level of the disc 4 may be changed if the top half 1 is bent is not eliminated.

As mentioned above, in the conventional cleaning mechanism, since the parallel ribs 7 in the first example and the projection 11 in the second example are formed integral with the top half 1, contact of the recording and reproducing head of the disc drive device to the recording surface of the disc 4 i.e., so called "head touch", is bad due to the change of the level of the disc. Besides, in order to realize the best cleaning effect by the upper and lower cleaning sheets 9 and 10, it is best to provide the cleaning mechanism, including the ribs 7 or projection 11, at the up stream side near the head insertion windows 1a and 2a. However, by this arrangement, the undesirable effect of a change, a rotation level of the disc 4, due to the bending of the top half 1, develops. Accordingly, in the conventional disc cartridge, the cleaning mechanism is provided at a position apart from the head insertion windows 1a and 2a, thus the disc 4 will contact the magnetic head after cleaning, so that foreign matter may collect on the cleaned sheets between the cleaning portion and the head insertion window and the cleaning effect is decreased.

SUMMARY OF THE INVENTION

An essential object of the present invention is to provide a disc cartridge having a cleaning mechanism which is able to clean the disc effectively suppressing change of the rotation level of the disc due to the deformation of the top half of the disc cartridge.

Another object of the present invention is to provide a disc cartridge which is able to operate with a high reliability preventing displacement of the cleaning piece or pressing plate for pressing the cleaning sheet to the disc.

In order to accomplish the objects mentioned above, according to the present invention, there is provided a a disc cartridge comprising an outer case formed of a top half and a bottom half, the latter assembled to the top half, to provide a disc chamber for accommodating a recording disc adapted to be rotated, a pair of pressing plates, each mounted in the top half and bottom half so as to oppose each other, cleaning sheets laid between the disc and the pressing plates and openings defined respectively in the top half and the bottom half so as to face each of the pressing plates for pressing said pressing plates toward the disc.

BRIEF EXPLANATION OF THE DRAWINGS

The present invention will become more fully understood from the detailed description given hereinbelow and the accompanying drawings which are given by way of illustration only, and thus are not limitative of the present invention, and wherein:

FIG. 28 is a plan view of the pressure plate used in the disc cartridge shown in FIG. 19, FIG. 29 is a cross sectional view taken along the lines A—A in FIG. 28, FIG. 30 is a perspective view of an erasure preventing member used in the disc cartridge shown in FIG. 9, FIG. 31 is a plan view showing a modification of the pressure plate, FIG. 32 is a plan view showing a further modification of the pressure plate, FIG. 33 is a plan view showing a further modification of the pressure plate, FIG. 34 is a cross sectional view showing a further modification of the pressure plate, FIG. 35 is a cross sectional view taken along the lines B—B in FIG. 19.

DETAILED DESCRIPTION OF THE INVENTION

Figure 1:
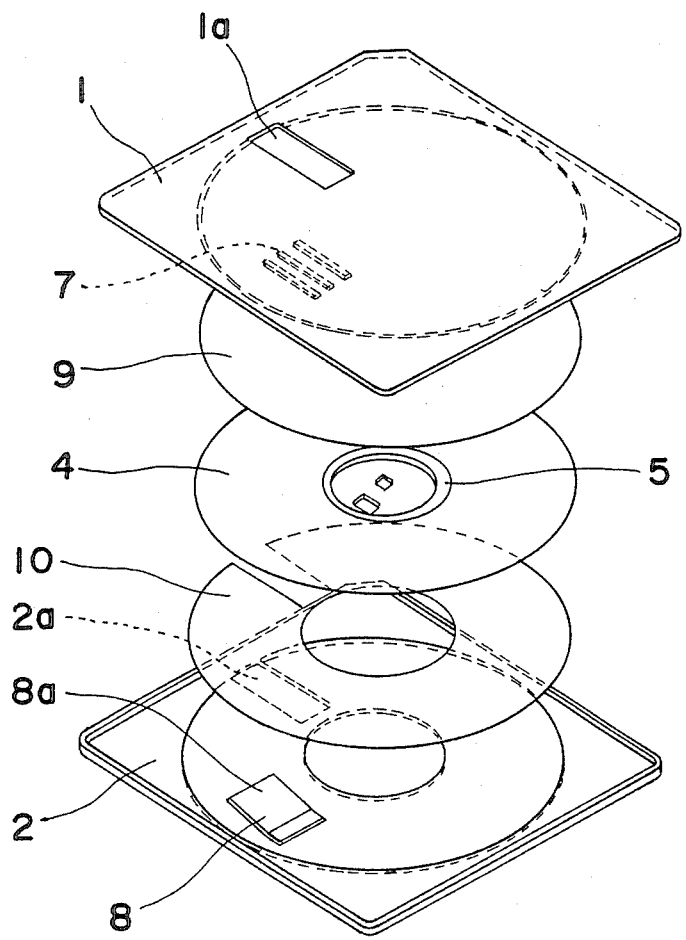
FIG. 1 is an exploded perspective view of an example of a conventional disc cartridge.
Figure 2:
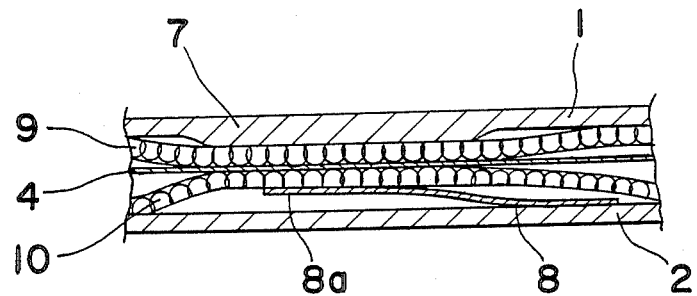
FIG. 2 is a cross sectional view of an essential portion of the disc cartridge shown in FIG. 1.
Figure 3:
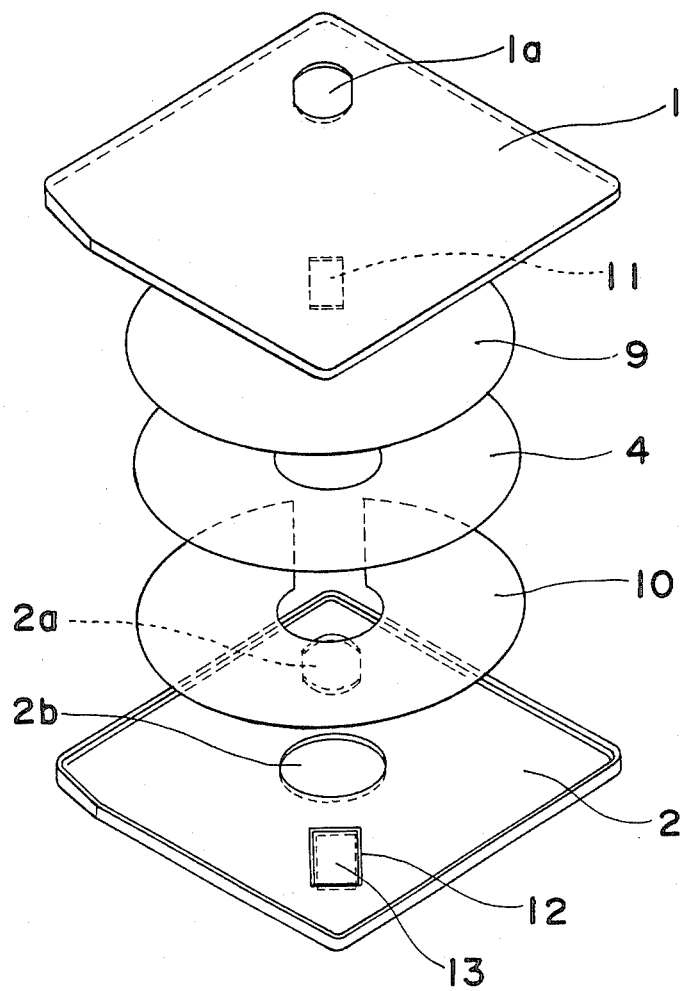
FIG. 3 is an perspective view of another example of a conventional disc cartridge.
Figure 4:
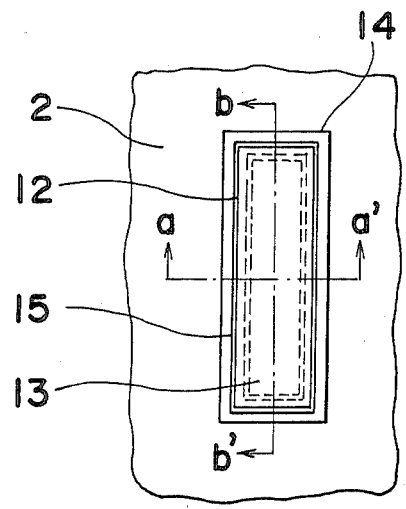
FIG. 4 is a partial plan view showing a cleaning mechanism used in the disc cartridge shown in FIG. 3.
Figure 5:
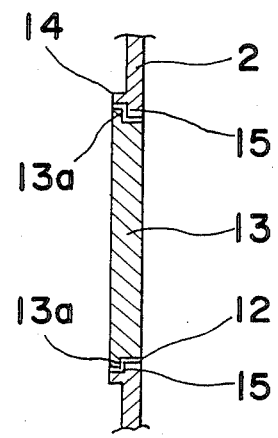
FIG. 5 is a cross sectional view taken along the lines b—b' in FIG. 4.
Figure 6:
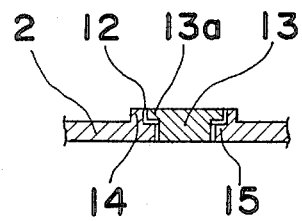
FIG. 6 is a cross sectional view taken along the lines a—a in FIG. 4.
Figure 7:
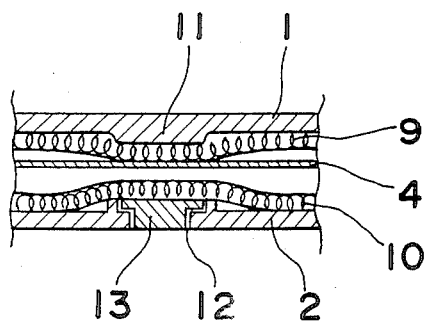
FIG. 7 is a cross sectional view of the cleaning mechanism shown in FIG. 4 with the cleaning piece unpressed.
Figure 8:
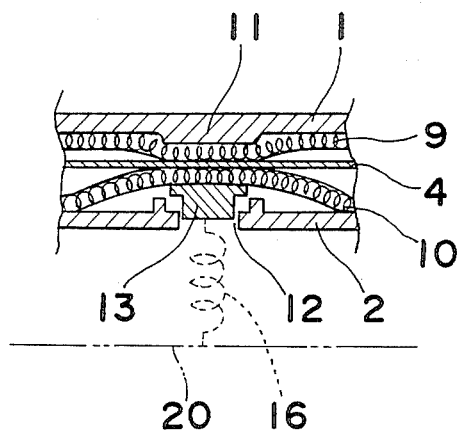
FIG. 8 is a cross sectional view of the cleaning mechanism shown in FIG. 4 with the cleaning piece being pressed.
Figure 9:
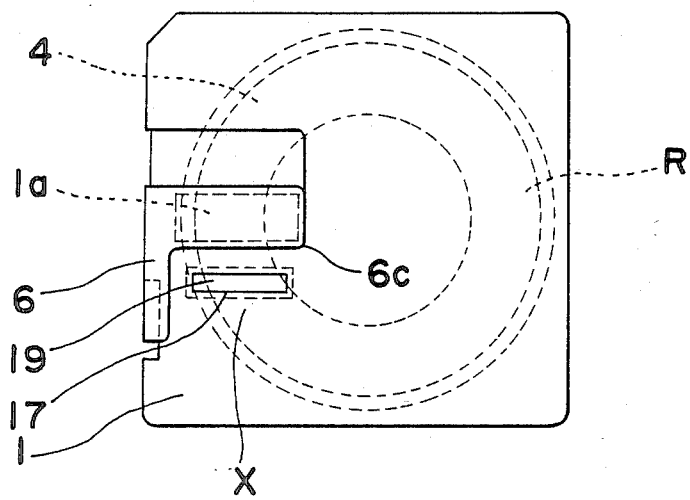
FIG. 9 is a top plan view showing an example of a disc cartridge according to the present invention.
Figure 10:
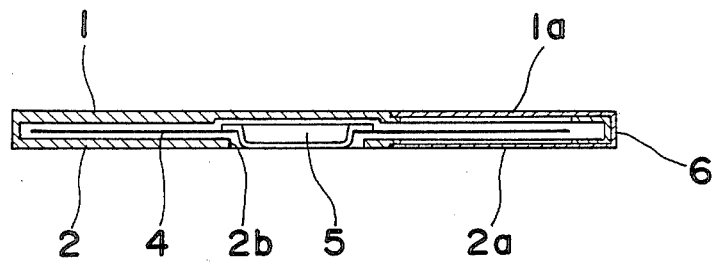
FIG. 10 is a cross sectional view of the disc cartridge shown in FIG. 9.
Figure 11:
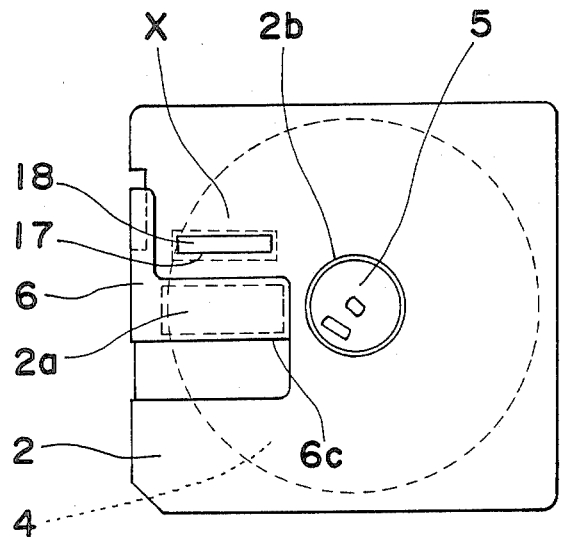
FIG. 11 is a bottom plan view of the disc cartridge shown in FIG. 9.
Figure 12:
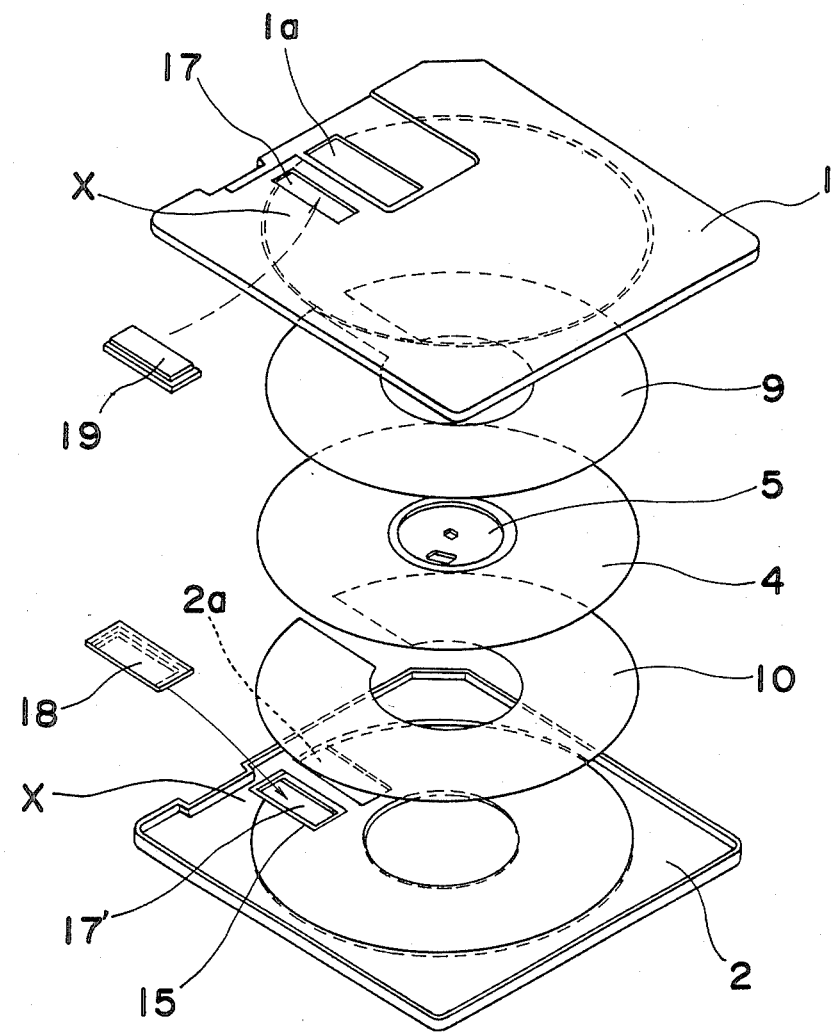
FIG. 12 is an exploded perspective view of the disc cartridge according to the present invention.

Referring now to FIGS. 9 to 18, the various components similar to those shown in FIGS. 1 to 8 are designated by like reference numerals and the description thereof is herein omitted. It is noted that the top half 1 and bottom half 2 are made of an ABS resin material. A shutter member 6 is slidably mounted on the outer case 3 at the head insertion window side so as to open the head insertion windows 1a and 2a when the disc cartridge is in use, and the head insertion windows are closed by the shutter 6 when the disc cartridge is not in use, so as to prevent entrance of foreign matter such as dust, into the inside of the disc cartridge through the head insertion windows 1a and 2a.

Figure 13:
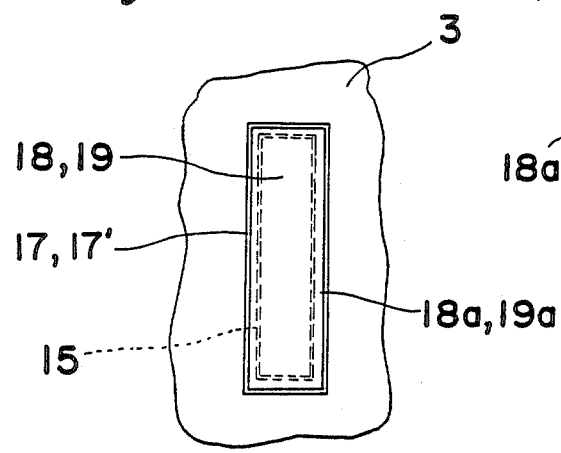
FIG. 13 is a partial plan view of the cleaning mechanism used in the disc cartridge shown in FIG. 9.
Figure 14:
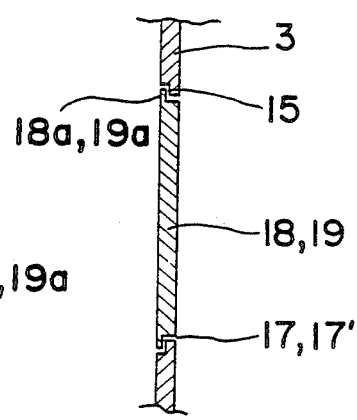
FIG. 14 is a cross sectional view of the pressure plate shown in FIG. 13.
Figure 15:
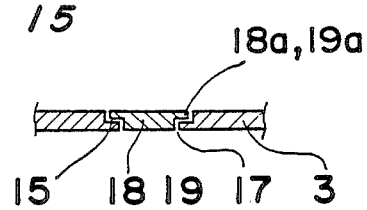
FIG. 15 is a cross sectional view of the pressure plate shown in FIG. 12.
Figure 16:
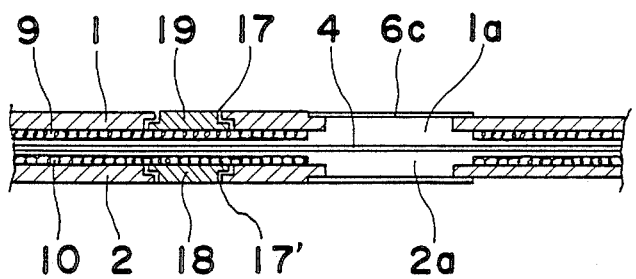
FIG. 16 is a cross sectional view of the essential portion of the cleaning mechanism used in the disc cartridge shown in FIG. 9 with the pressure plate in an unpressed state.
Figure 36:
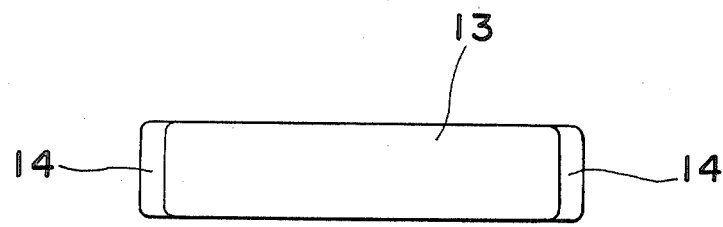
FIG. 36 is a top plan view showing a further modification of the pressure plate.
Figure 37:
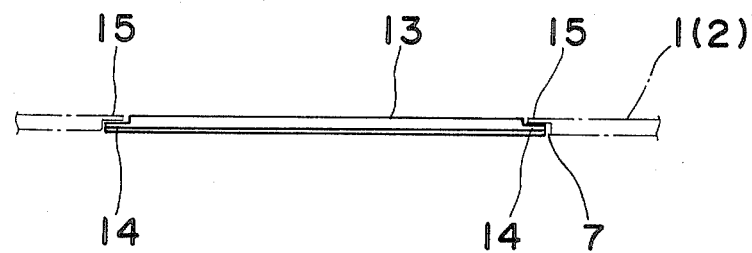
FIG. 37 is a side view of the pressure plate shown in FIG. 36.

A pair of openings 17 and 17' in the shape of through holes of a generally elongated rectangular shape are defined on the top half 1 and bottom half 2 at the up stream side with respect to the directions of rotation of the disc 4, near the head insertion windows 1a and 2a, so as to extend in parallel with the head insertion windows, crossing over the recordable area R of the disc 4. A first pressure plate 18 is fitted in the opening 17 of the top half 1 so as to move between the upper cleaning sheet 9 and the top half 1. A second pressure plate 19 is fitted in the opening 17' of the bottom half 2 so as to move between the lower cleaning sheet 10 and the bottom half 2. Both of the pressure plates 18 and 19 are situated in the openings 17 and 17' so as not to press the disc 4 when the disc cartridge is not in use. Both of the pressure plates 18 and 19 are kept in the openings 17 and 17' in such a manner shown in FIGS. 13 to 15. Since the pressure plate 19 is kept in the opening 17' in a similar manner as the pressure plate 18 is kept in the opening 17, the explanation is made only with respect to the pressure plate 18. The pressure plate 18 has stepped flanges 18a detachably rested on corresponding receiving edges 15 formed along the peripheral edges of the opening 17 and stepped downward from the inner face of the top half 1 so as to prevent the pressure plate 18 from being removed from the top half 1, but to allow movement toward the cleaning sheet 9 and the disc 4. As shown in FIGS. 13 to 15, the stepped flange 18a and the receiving edge 15 are formed at the four sides. However, it is not essential to form the stepped flanges 18a and the receiving edges 15 on the respective four sides, but they may be formed only on opposing two sides, as shown in FIGS. 36 and 37 or only one of the four sides.

In the disc cartridge as mentioned above, since no force is applied to the pressure plates 18 and 19 when the disc cartridge is not in use, no force is applied to the disc 4 from the pressure plates 18 and 19.

Figure 17:
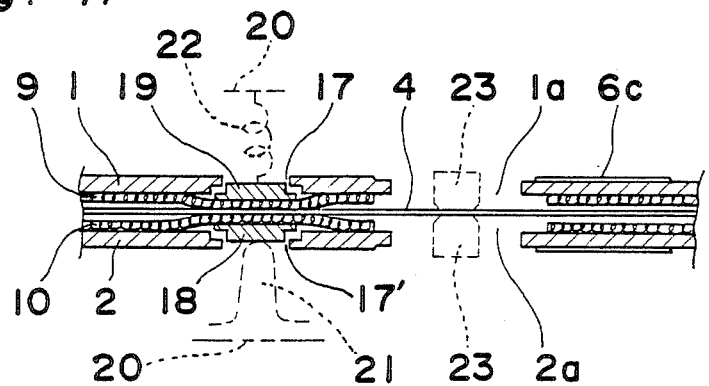
FIG. 17 is a cross sectional view of the cleaning mechanism used in the disc cartridge shown in FIG. 9 with the pressure plate in a pressed state.

When the disc cartridge is used, the disc cartridge mentioned above is inserted in the disc drive device 20 in such a manner as shown in FIG. 17. Since the disc drive device 20 comprises a projected rib 21 formed at a position corresponding to the lower part of the outer case 3 of the disc cartridge for regulating the level of the disc cartridge in the disc drive device 20 and a spring member 22 to press the pressure plate 19 above the disc cartridge, upon insertion of the disc cartridge into the disc drive device 20, the first pressure plate 18 is lifted by the projected rib 21 up to a predetermined level so as to regulate the level of the floppy disc 4 at the standard level in the disc drive device, while the second pressure plate 19 is pressed downward by the force of the spring member 22 resulting in pressing the floppy disc 4 through the upper sheet 9 toward the first pressure plate 18. Under this state, the magnetic head 23 faces the head insertion windows 1a and 2a to scan the recording surface of the floppy disc 4, whereby recording in or reproducing from the floppy disc can be performed in the known manner.

Accordingly, in the embodiment described above, the floppy disc 4 is not pressed when not in use, but is subjected to the pressure only when in use, therefore, it is possible to increase the pressure on the upper and lower cleaning sheets toward the floppy disc 4 when in use. On the other hand, in case the disc cartridge is preserved for a long time, there is no fear of forming trace marks in the floppy disc since no pressure is applied to the disc cartridge. Also, there is no fear of entrance of foreign matter on the floppy disc 4. In addition, since the level of the floppy disc 4 in the disc drive device is regulated by the height of the projected rib 21 at the position near the upstream side of the head insertion windows 1a and 2a, the level of the floppy disc 4 can be kept constant irrespective of any deformation in the top half 1a, whereby the level of contact between the magnetic heads 23 and the floppy disc 4 can be kept constant to assure good head contact. Also, fluctuation of the floppy disc 4 in a vertical direction can be prevented to assure a stable head output.

Although in the embodiment mentioned above the cleaning sheets are laid on the inner faces of the top half and bottom half so as to cover generally all the area of the floppy disc, the cleaning sheets may be provided on only such area that covers the pressure plates 18 and 19.

Figure 18:
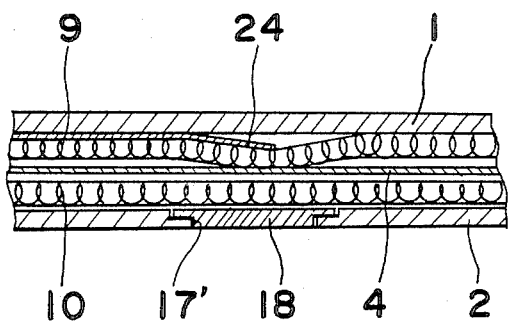
FIG. 18 is a modification of the cleaning mechanism shown in FIG. 13.

As the means for applying pressure to the upper cleaning sheet, as shown in FIG. 18, there may be laid a resilient plate 24 between the upper cleaning sheet 9 and the top half 1, having a free end of the plate 24 slightly bent toward the cleaning sheet so that the pressing force of the upper cleaning sheet 9 toward the floppy disc 4 is small when not in use but the floppy disc 4 is resiliently pressed to the upper cleaning sheet with a sufficient force when in use by the force upon lifting of the first pressure plate 18 up to the standard level and the lower cleaning sheet 10 by the projected rib 21.

The pressure plate may be disposed anywhere so long as the pressure plate is situated across from the recording area of the floppy disc 4.

In the embodiment of the disc cartridge mentioned above, both pressure plates 18 and 19 are movably fitted in the openings 17 and 17'. On the contrary the cleaning sheets 9 and 10 must be movable by the pressure plates, therefore at least a portion of each cleaning sheet facing the respective pressure plate must be movable in a direction generally perpendicular to the surface of the floppy disc, whereby the periphery of the area of the cleaning sheet facing the pressure plate is not bonded to either the top half 1 or bottom half 2. Therefore, the pressure plate 18 or 19 may undesirably be removed from the opening 17 entering into a space between the top half 1 and the upper cleaning sheet 9 or bottom half 2 and the lower cleaning sheet 10. In case the pressure plate 18 (or 19) enters in such a space, the cleaning sheet is projected toward the inside of the disc cartridge, whereby the floppy disc 4 is deformed partially, resulting in harming the good recording and reproducing characteristics.

In order to prevent entrance of the pressure plates into a space between the cleaning sheet and the top half or the bottom half, there may be provided ribs projected inwardly surrounding the inner periphery of the opening 17. However, since the cleaning sheets 9 and 10 are laid in the region of rotation of the floppy disc 4 and it is required to provide a space to assure rotation of the floppy disc 4 in the disc cartridge, accordingly it is very difficult to form such ribs in the interior of the disc chamber where the floppy disc 4 is rotatably accommodated. In addition, even if such ribs are formed in the disc cartridge, the height of the ribs may not be so high as to effectively prevent the entrance of the pressure plate into the space between the cleaning sheet and the outer case.

The second embodiment of the present invention described hereinafter is effectivee to eliminate this problem.

Referring to FIGS. 19 to 30, the outer case 3 of the disc cartridge made of the top half 1 and bottom half 2 is formed in a similar manner as mentioned in the first embodiment and the floppy disc 4 is rotatably accommodated in the disc cartridge, being sandwiched by the upper and lower cleaning sheets 9 and 10.

A pair of head insertion windows 105 of an elongated rectangular shape are defined on the region near one of the sides of the disc cartridge, for example the front side 200, in both of the top half 1 and bottom half 2. In the central region of the bottom half 2 (FIG. 24), there is defined the circular hole 2b. In the front half region of each of the top half 1 and bottom half 2, a shallow recess 6X having a generally trapezoidal shape is defined for movably accommodating the shutter 6 and limiting the movement of the shutter 6. The head insertion windows 105 are defined in the recesses 6X.

Figure 20:
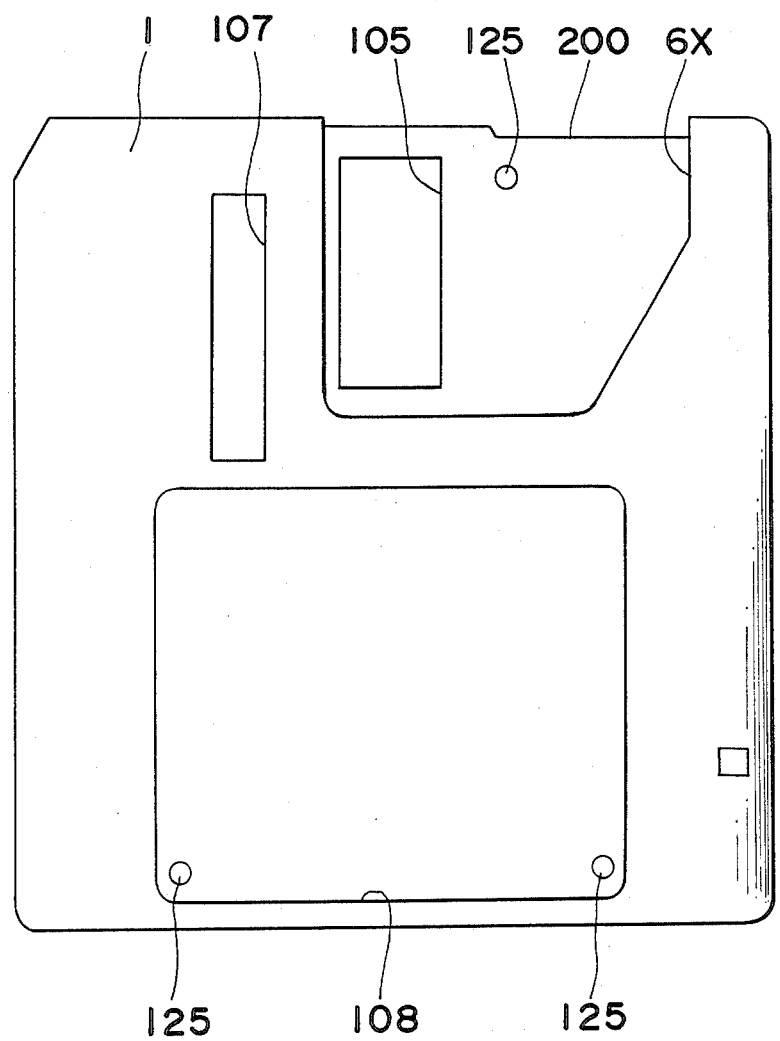
FIG. 20 is an outside plan view of the top half of the disc cartridge of the second embodiment.
Figure 22:
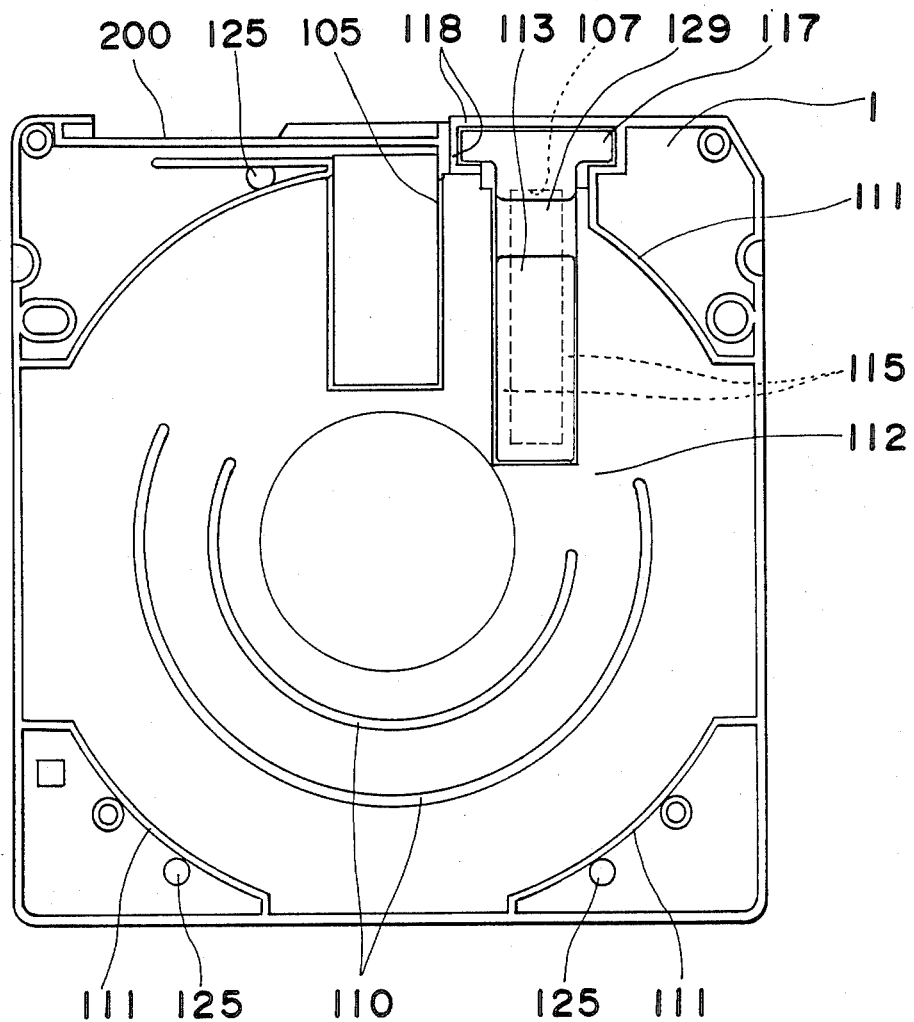
FIG. 22 is an inside plan view of the top half of FIG. 20 with the pressure plate mounted.

As shown in FIG. 20, an elongated opening 107 is defined for receiving the pressure plate 113, shown in FIG. 22, so as to extend in parallel with the head insertion window 105 at a position up stream of the rotational direction of the disc 4 with respect to the head insertion window 105.

Figure 19:
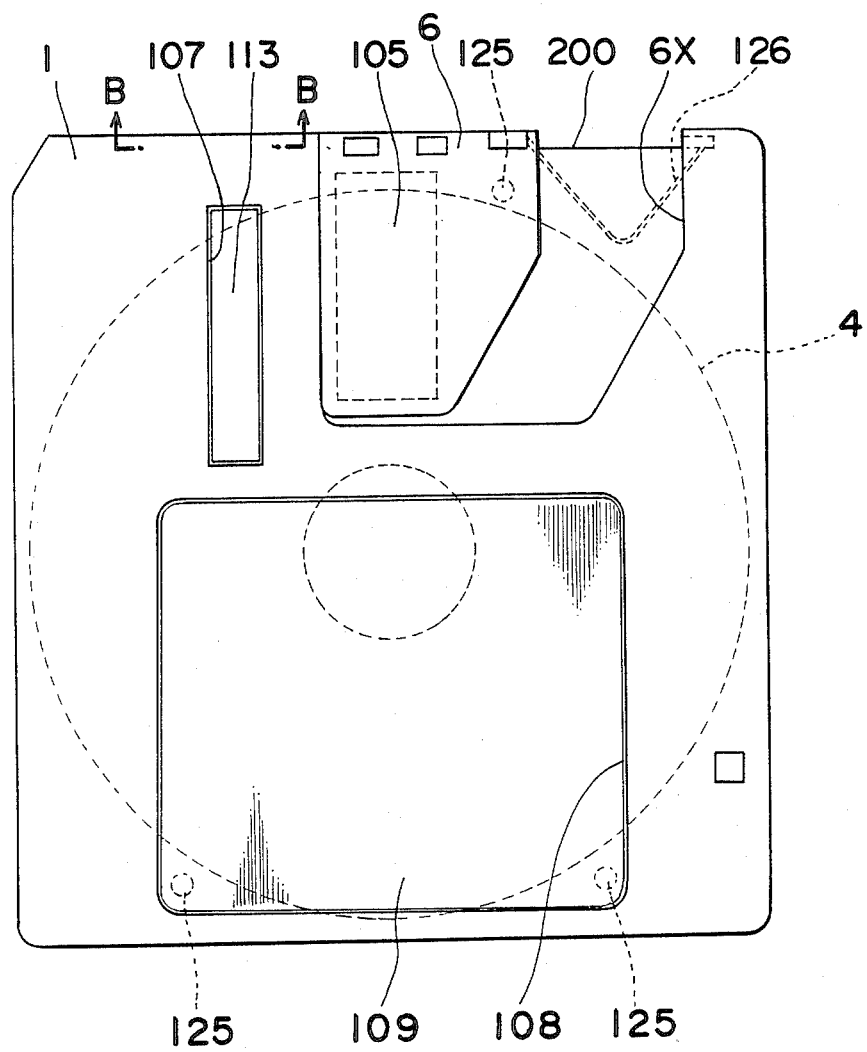
FIG. 19 is a top plan view of the second embodiment of the disc cartridge according to the present invention.
Figure 21:
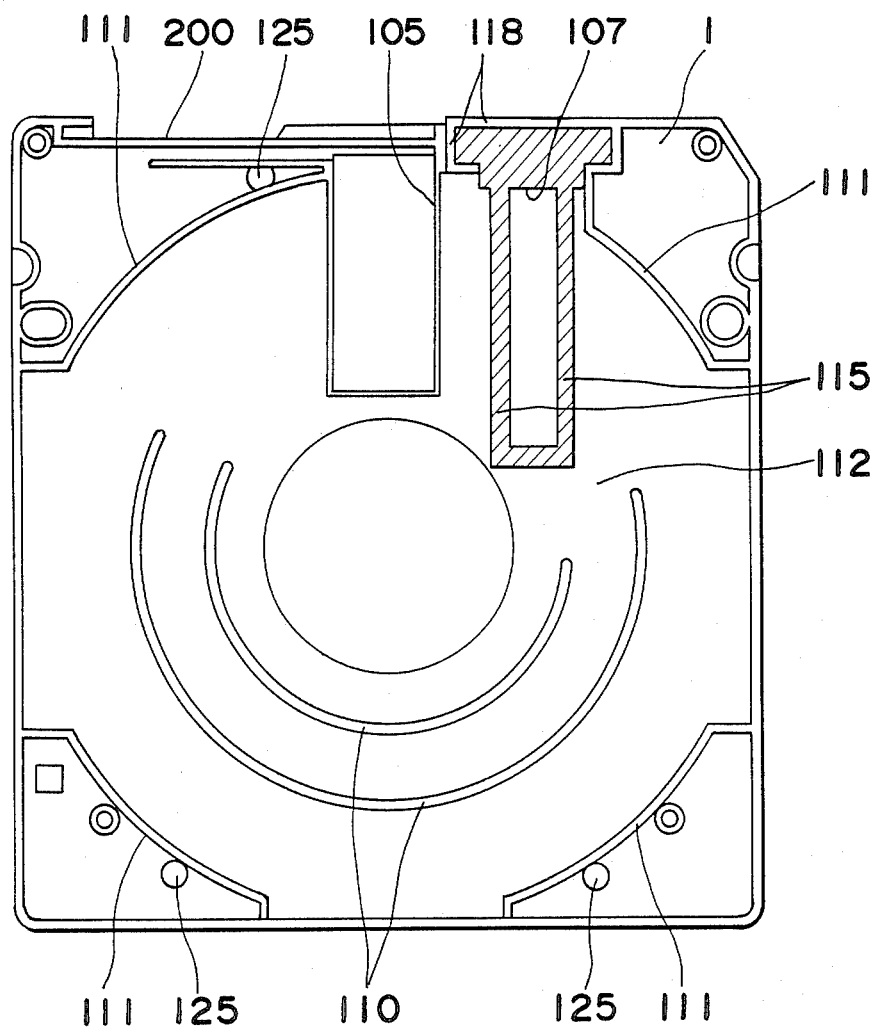
FIG. 21 is an inside plan view of the top half of FIG. 20.

In the rear half region of the top half 1, a label fitting area 108 is recessed with a shallow depth for fitting a label 109, as shown in FIG. 19. As shown in FIG. 21, four ribs 111 are formed at the respective corners of the inside of the top half 1 to define a disc chamber 112 which generally corresponds to the disc rotation area. Two arcuated ribs 110 are formed in the inside of the top half 1 coaxial with each other and with the center of the circular hole 2b, shown in FIG. 24, accommodated in the disc chamber 112 except for the region where the head insertion window 105 and the opening 107 are defined. The number of the ribs 110 may be more than one and preferably several.

A pressure plate 113, as shown in FIGS. 28 and 29, is movably fitted in the opening 107. The pressing plate 113 is made of plastic resin material and has a generally T shape made of an elongated pressing portion 114 of generally similar shape of the opening 107 and an expansion portion or plate 117 extending from both sides of the pressing portion 114. The pressing portion 114 is surrounded by flanges 132 for engaging with stepped shoulders 115 formed at the peripheral edges of the top half 1 defining the opening 107 (see FIGS. 21 and 24). A shallow recess 129 is formed on one surface of the pressing portion 114 near the expanding plate 117 so as to face the outer peripheral portion of the disc 4.

Figure 24:
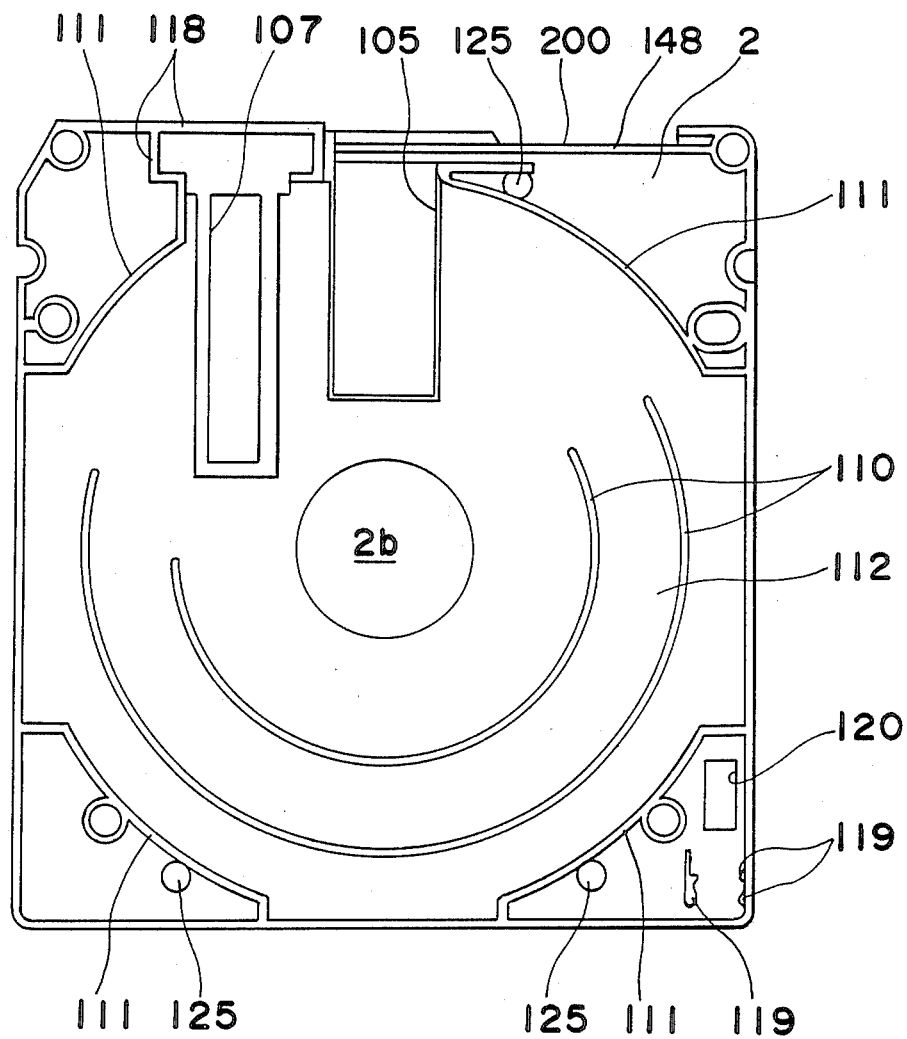
FIG. 24 is an inside plan view of a bottom half.

As shown in FIGS. 21 and 24, engaging ribs 118 for preventing displacement of the pressure plate 113 with a generally C shape are formed in the front edge portion of both of the top half 1 and bottom half 2 respectively for surrounding the expanding plate 117. It is noted that the engaging ribs 18 are formed at the outside of the disc rotation area so as to make it possible to omit consideration of the space wherein the cleaning sheet exists and the rotation of the disc 4. Therefore, it is possible to make the engaging rib having a suitable height to assure engagement of the pressure plate 114.

Figure 25:
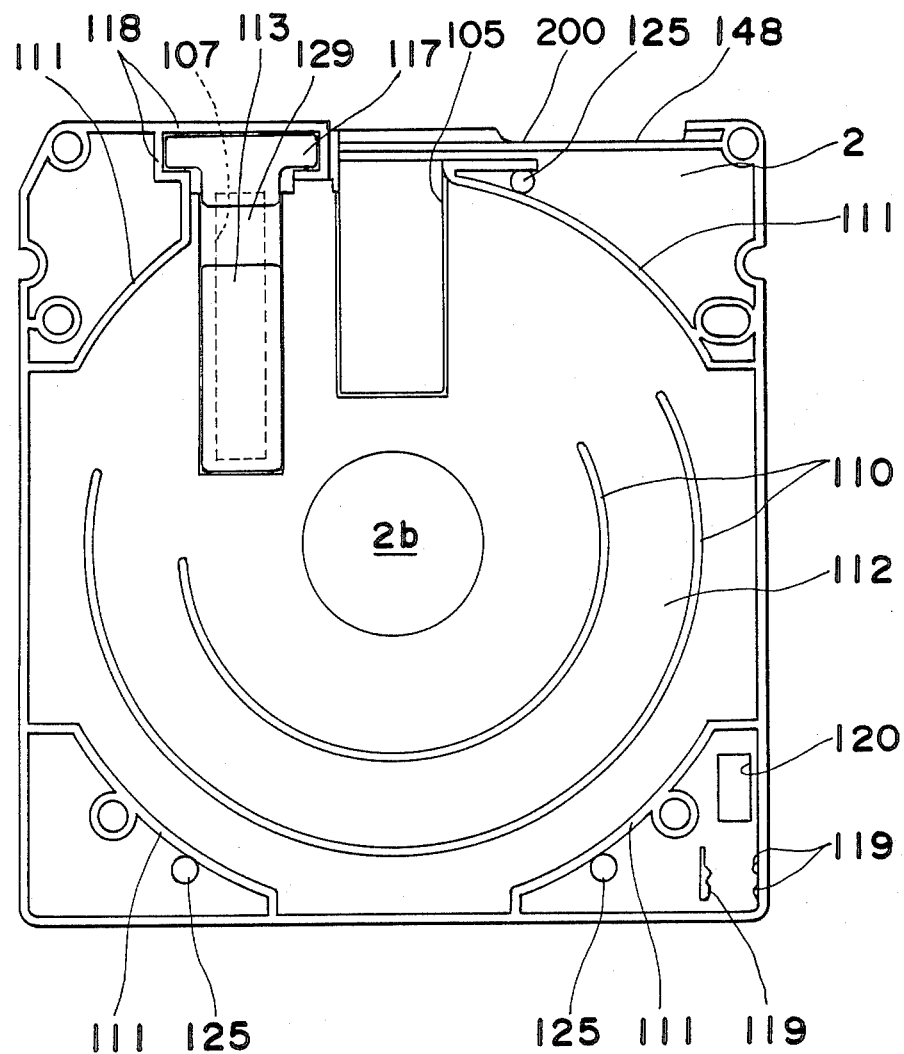
FIG. 25 is an inside plan view of a bottom half with the pressure plate mounted.

As shown in FIGS. 22 and 25, each pressure plate 113 is fitted in the opening 107 of the top half 1 and bottom half 2 fitting the expanding plate 117 in the space surrounded by the engaging ribs 118. The pressing portion 114 is situated in the rotation area of the disc 4 and flange 132 is engaged with the stepped shoulder 115 to prevent removal of the pressure plate 113 from the opening 107. Also, the pressure plate 113 can be kept in position without displacement since the expanding plate 117 is engaged with the engaging ribs 118.

FIG. 35 shows a cross sectional view taken along the lines B—B in FIG. 19. Referring to FIG. 35, when the top half 1 and bottom half 2 are assembled together, both top ends of the engaging ribs 118 of the respective halves 1 and 2 abut together to provide a chamber surrounded by the engaging ribs 118 and both expanding plates 117 are accommodated in the chamber opposed to each other.

Figure 23:
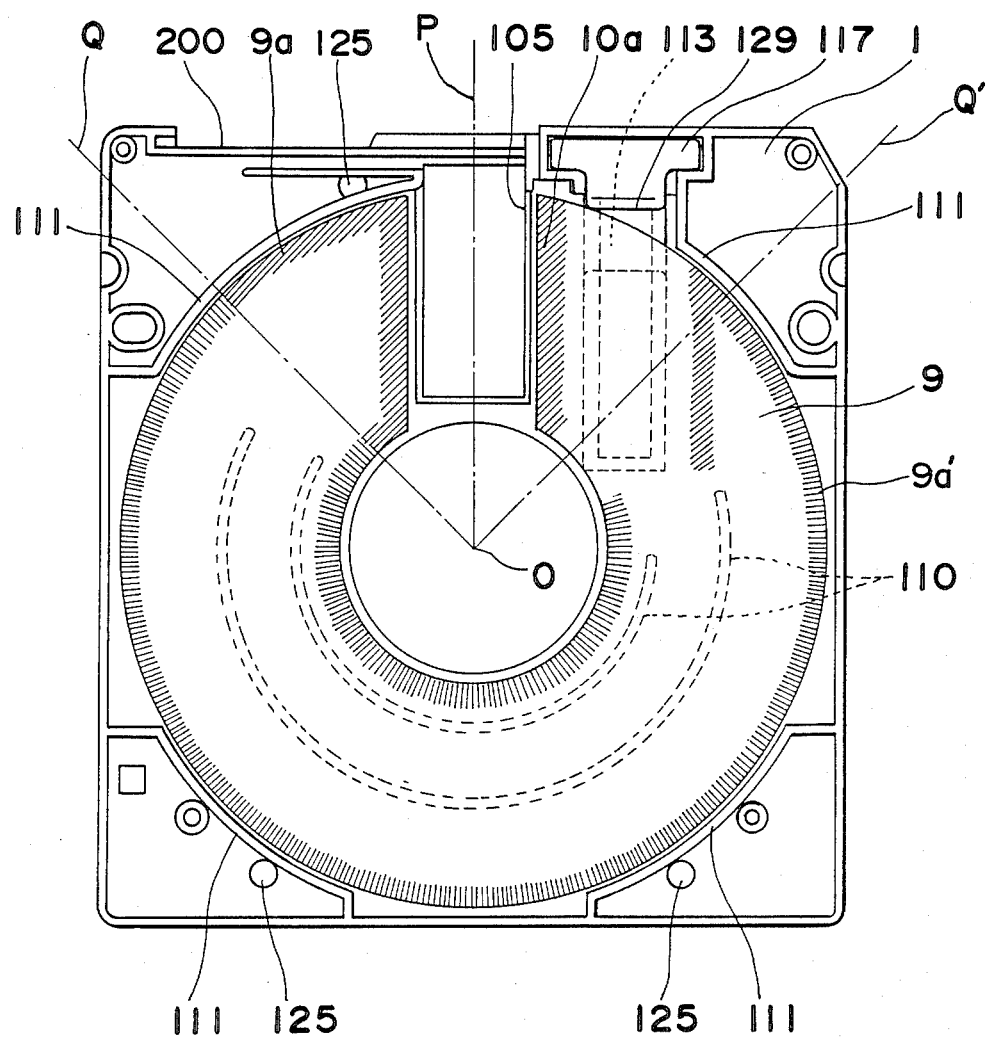
FIG. 23 is an inside plan view of the top half of FIG. 20 with the pressure plate and cleaning sheet mounted.
Figure 26:
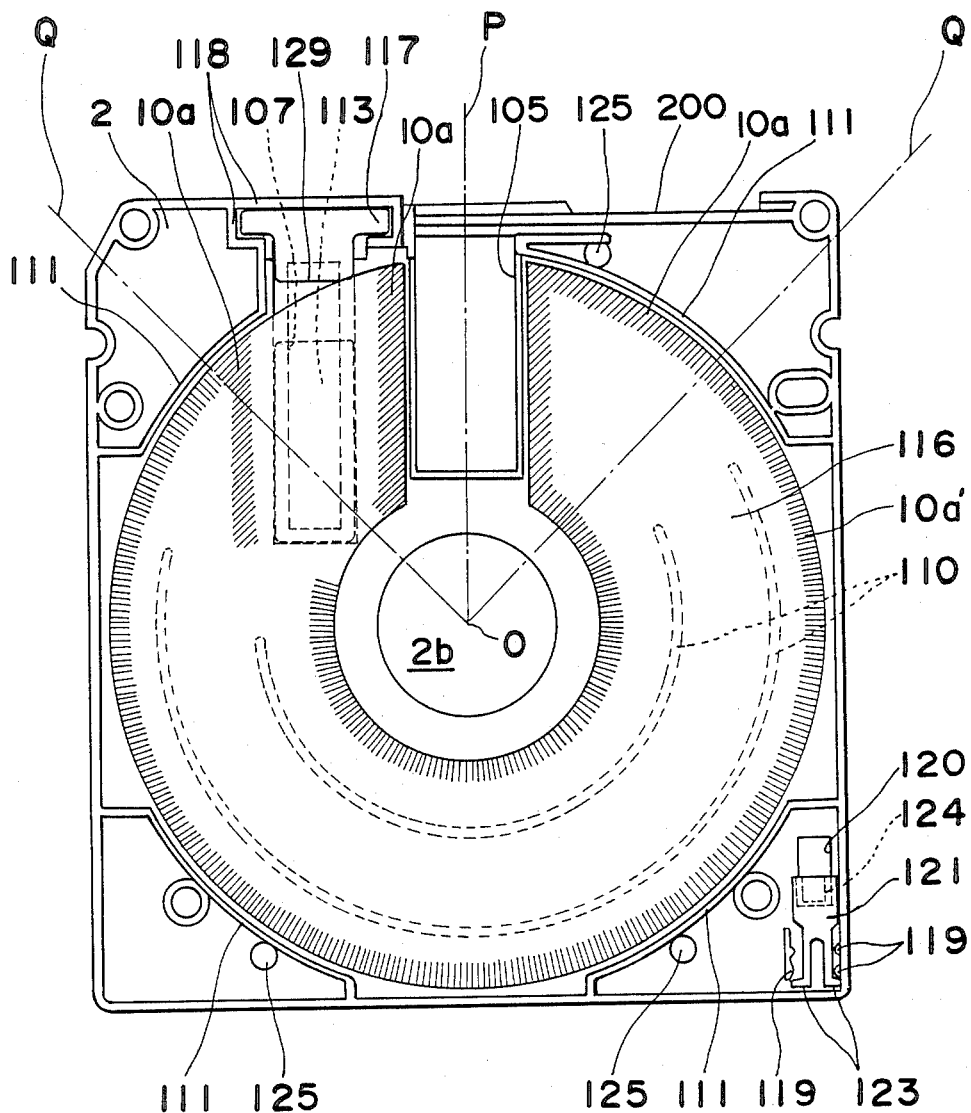
FIG. 26 is an inside plan view of a bottom half with the pressure plate and cleaning sheet mounted.
Figure 27:
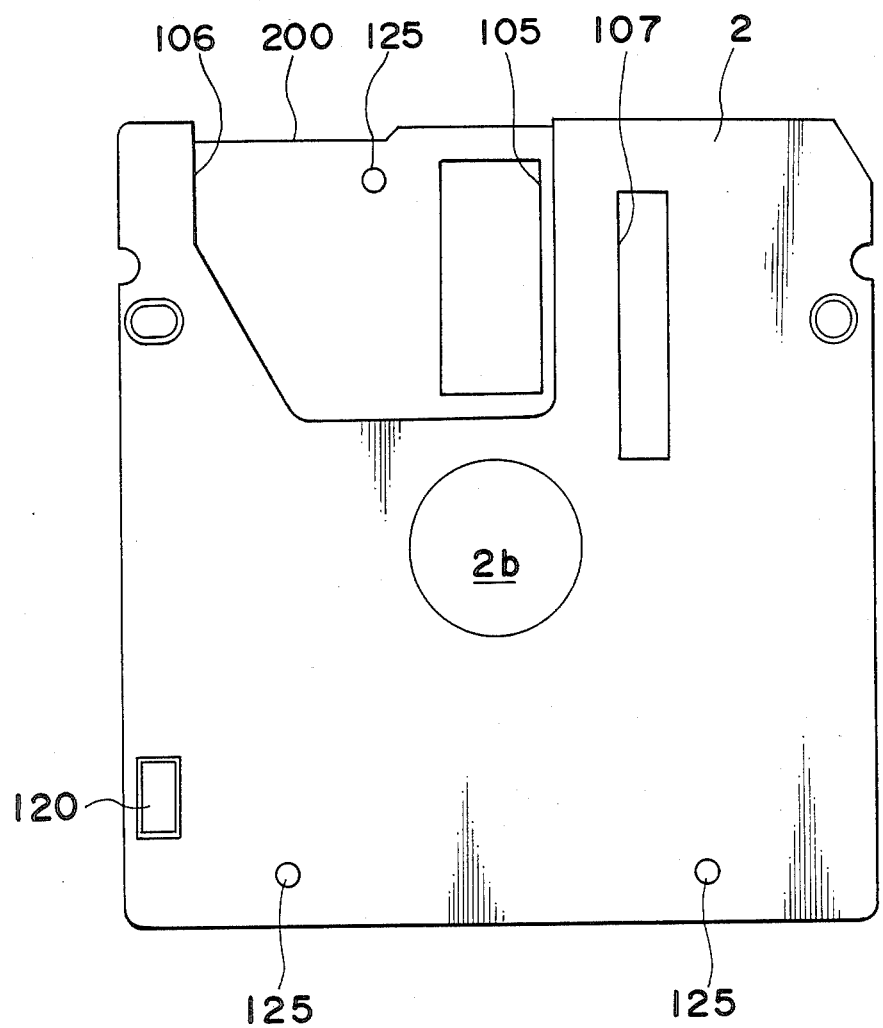
FIG. 27 is an outside plan view of the disc cartridge of the second embodiment.

In assembling the disc cartridge, after putting the pressure portion 114 of the pressing plate 113 in the opening 107 with the expanding plate 117 fitting in the space surrounded by the ribs 18, there is laid in the disc chamber, the upper cleaning sheet 9 made of non woven sheet of polypropylene rayon having a generally annular shape of almost similar shape of the disc chamber 112. In the bottom half 2, the pressure plate and the cleaning sheet are arranged in the same manner as mentioned above. In this arrangement, peripheral edges of the cleaning sheets 9 and 10 are respectively bonded partially to the top half 1 and bottom half 2 by thermal bonding. FIGS. 23 and 26 show an example of a manner of bonding of the cleaning sheets 9 and 10. In the example shown, the respective peripheral edges of the cleaning sheet 9 (10) defined by the lines Q and Q' are bonded along the lines inclined 45° against the line OP which passes the center O of the disc cartridge and the center of the head insertion window 105. The line Q and Q' are inclined 45° on both sides against the line OP. The shaded portions 9a in FIG. 23 and 10a in FIG. 25 show the thermally bonded area of the cleaning sheets 9 and 10. The other peripheral edges of the respective cleaning sheets 9 and 10, are bonded to the top half 1 and bottom half 2 along the lines extending in the radial direction as shown at 9a' and 10a'. At the region (shown at 9b and 10b) of the cleaning sheets 9 and 10 near the opening 107, the thermal bonding is made along the lines inclined 45° against the line OP. By bonding the cleaning sheets 9 and 10 to the upper half 1 and bottom half 2 mentioned above, each pressure plate 113 is covered by the respective cleaning sheet 9 (10).

As shown in FIGS. 24 to 26, projections 119 of mountain shape are formed in one corner of the inside of the bottom half 2 and an operation opening 120 of a rectangular shape is defined near the projections 119. A write protector 121 for preventing erasure of a recorded signal is movably mounted at a space defined by the projections 19 and the operation opening 120. The write protector 121 is composed of a body 122 and legs 123 with each of the legs 123 engaged with the projections 119 resiliently and an operation tip 124 formed on the body 122 is inserted in the operation opening 120. In FIG. 26, the write protector 121 is situated at a position where write-in of a signal is inhibited or erasure of the signal is inhibited. Upon sliding the write protector 121 along the longitudinal direction of the operation opening 120, the ends of the legs of the write protector 121 are disengaged from the projections and the write protector can be moved to the write-enable position.

Reference numeral 125 shows gate marks which are formed when molding of the top half 1 and bottom half 2. It is appreciated that in the embodiment shown, one of the gate marks 125 of each of the top half 1 and bottom half 2 is formed in the area of the recess 6X. Since the thickness of the wall for defining the recess 6X is thinner than the other parts of the disc cartridge, in other words the gap between the molding forming the wall of the recess 6X is small, if the injection gate is not provided in the region of the recess 6X, there tends to occur poor molding in the wall of the recess 6X. In order to prevent the problem mentioned above, one of the injection gates is provided at the position in the mold for the recess 6X so as to make it possible to change the injection pressure and maintaining pressure of the gate for the recess 6X independently to improve the moldability.

The position of the gate mark 125 in the recess 6X is so defined, as shown in FIG. 19, such that the gate mark can be covered by the shutter 6 despite the fact that the shutter is opened or closed. In case of the top half 1, two gate marks 125 are provided in the label fitting area 108 to cover the gate marks 125 by the label 109, thereby concealing the gate marks.

The shutter 6 is made of plastic resin material such as polyacetal resin and polyamid resin which is slightly softer and more resilient than the disc cartridge. As shown in FIG. 19, the shutter is normally biased toward the position for closing the head insertion window 105 by a spring 126.

Examples of modification of the pressure plate 113 and the engaging rib 118 are shown in FIGS. 31, 32, 33 and 34.

In FIG. 31, the pressure plate 113 or 114 is formed by an L shape in plan view and the engaging ribs 118 are formed so as to surround the expanding plate 117.

In FIG. 32, the pressure plate 113 is formed by a generally elongated rectangular shape having both of its sides cut at 127. In this case, the engaging rib may be formed in the form of projections 127 engageable with the cut portion 127.

In FIG. 33, the pressure plate 113 or 114 is formed generally in T shape with an engaging hole 128 of a generally rectangular shape defined at the intermediate portion of the expanding plate so that the engaging hole 128 is engaged with an engaging rib 118 having a rectangular shape. The shape of the engaging hole 128 and the engaging rib may be selected as desired except for a circular shape for preventing rotation of the pressing plate 113.

As shown FIG. 34, both upper pressure plate and lower pressure plate may be engaged with each other so as to prevent position displacement. Specifically, the upper pressure plate 113a of the top half 1 and the lower pressure plate 113b of the bottom half 2 are situated so as to oppose each other. An engaging pin 130 is projected from the expanding plate 117 of the upper pressure plate 113a so that the engaging pin 130 is detachable engaged in an engaging recess 131 defined in the lower pressure plate 113b. By this engagement between the engaging pin 130 and the recess 131, displacement of the pressure plates 113a and 113b can be prevented. In the example shown in FIG. 34, one of the pressing plates 113a and 113b may be engaged with the disc cartridge so as to prevent displacement of the pressing plate.

In the examples mentioned above, the engaging ribs 118 having a relatively large height are formed on the inner surface of the disc cartridge so that the expansion portion or plate 117 can be engaged with the ribs 118, however, it is possible to make the height of the engaging ribs relatively low, making the thickness of the expanding plate portion 118 thick in such a range that the pressure plate is movable in a vertical direction, whereby displacement of the engaging ribs and expanding plate can be prevented by the engagement of the engaging ribs and the expanding plate. Moreover, the expanding plate portion may be engaged in a recess formed in the top half or bottom half in place of the engaging rib.

Moreover, although in the embodiments mentioned above, the plate pressing opening 107 is formed corresponding to the position of the pressure plate, the present invention is not limited to this arrangement mentioned above and it may be possible to make a part of the halves 1 or 2 thin, corresponding to the pressure plate 113, for resilient deformation so that the resiliently deformed portion can press the cleaning sheet to the disc to effect the cleaning of the disc.

Although in the embodiment mentioned above, the pressure plates are formed in both of the top half 1 and bottom half 2, according to the present invention, the pressure plate may be provided in only any one of the top and bottom halves 1 and 2 and a receiving projected portion, having a flat end surface corresponding to the pressure plate, may be formed in the other half.

Moreover, according to the present invention, the cleaning sheet may be formed only in a area opposing the respective pressure plate in place of laying the cleaning sheet over the entire recording area of the disc.

Also, the present invention may be used not only in the magnetic disc cartridge but in the other types of disc cartridges, such as magneto-optical disc cartridge.

As mentioned above, it is one advantage of the present invention that the disc can be maintained at a standard position irrespective of the deformation of the disc with a high efficiency of the cleaning of the disc, and, in addition, the output of the disc can be kept high and stabilized.

Moreover it is further advantages of the present invention that since the pressure plate can be prevented from displacement, and the pressure plate can be always kept at a predetermined position, it is possible to improve the reliability of the pressure plate. Also, since means for preventing the displacement of the pressure plate is provided in a position outside of the rotation area of the disc, the ribs or projections for preventing displacement of the pressure plate can be formed at a relatively large height, and it is possible to maintain smooth rotation of the disc and design of the disc cartridge is made easy.

The invention being thus described, it will obvious that the same may be varied in many ways. Such variations are not to be regarded as a departure form the spirit and scope of the present invention, and all such modifications as would be obvious to one skilled in the art are intended to be included within the scope of the following claims.

What is claimed is:

1. A disc cartridge comprising an outer case formed of a top half and a bottom half assembled to the top half to provide a disc chamber for accommodating a recording disc adapted to be rotated, a pair of pressure plates movably captured within the top half and bottom half of said outer case respectively so as to oppose each other in proper alignment, cleaning sheets positioned between said disc and said pressure plates, and openings defined respectively in said top half and bottom half of said outer case for accommodating each of said pressure plates such that said pressure plates are adapted to contact their associated cleaning sheet and exert a substantially uniform normal pressure onto said disc, said pressure plates and corresponding openings juxtapositioned just prior to head insertion openings defined in said top and bottom half.

2. The disc cartridge according to claim 1, wherein said pressure plates are situated extending across the recording area of said disc.

3. The disc cartridge according to claim 1, wherein said pressure plates are situated in positions just prior to said head insertion windows with respect to rotation of said disc.

4. The disc cartridge according to claim 3, wherein said respective pressure plates are situated in parallel with said corresponding head insertion window.

5. The disc cartridge according to claim 1, wherein said disc cartridge further comprises engaging means for preventing displacement of said respective pressure plates disposed on the inside of said top half and bottom half portions of said cartridge for engagement of said respective pressure plates at a position outside the rotational area of said disc.

6. The disc cartridge according to claim 5, wherein said pressure plate comprises a pressing plate portion and an expanding plate portion projected from an end portion of said pressing plate portion said disc cartridge being provided with an engaging means for engagement of said expanding plate portion.

7. The disc cartridge according to claim 5, wherein a recess is formed on a portion of said pressure plate corresponding to an outer peripheral edge portion of said disc.

* * * * *